US006310145B1

(12) United States Patent
Puyenbroek et al.

(10) Patent No.: US 6,310,145 B1
(45) Date of Patent: *Oct. 30, 2001

(54) FLAME RETARDANT POLYETHERIMIDE RESIN COMPOSITION WITH POLYCARBONATE AND POLYSILOXANE

(75) Inventors: Robert Puyenbroek, Bergen op Zoom (NL); Darryl Nazareth, Flanders, NJ (US)

(73) Assignee: General Electric Company, Pittsfield, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/984,913

(22) Filed: Dec. 4, 1997

(51) Int. Cl.$^7$ ..................................... C08L 79/08
(52) U.S. Cl. .......................... 525/431; 525/425; 525/433
(58) Field of Search ..................... 525/425, 431, 525/433, 464, 467

(56) References Cited

U.S. PATENT DOCUMENTS

| | | | |
|---|---|---|---|
| 3,169,121 | 2/1965 | Goldberg | 260/47 |
| 3,544,514 | 12/1970 | Schnell et al. | 260/47 |
| 3,635,895 | 1/1972 | Kramer | 260/47 |
| 3,803,085 | 4/1974 | Takehoshi et al. | 260/46.5 |
| 3,814,869 | 6/1974 | DeLuca | 179/175 |
| 3,847,867 | 11/1974 | Heath et al. | 260/47 |
| 3,850,885 | 11/1974 | Takekoshi et al. | 260/47 |
| 3,852,242 | 12/1974 | White | 260/47 |
| 3,855,178 | 12/1974 | White et al. | 260/45.7 |
| 3,905,942 | 9/1975 | Takekoshi et al. | 260/47 |
| 3,971,756 | 7/1976 | Bialous et al. | 260/45.7 R |
| 3,972,902 | 8/1976 | Heath et al. | 260/346.3 |
| 3,983,093 | 9/1976 | Williams, III et al. | 260/47 |
| 4,001,184 | 1/1977 | Scott | 260/47 |
| 4,221,728 | * 9/1980 | Jaquiss et al. | 260/37 |
| 4,358,556 | * 11/1982 | Van Abeelen | 524/267 |
| 4,455,410 | 6/1984 | Giles, Jr. | 525/436 |
| 4,487,896 | 12/1984 | Mark et al. | 525/439 |
| 4,548,997 | * 10/1985 | Mellinger et al. | 525/433 |
| 4,663,378 | * 5/1987 | Allen | 524/267 |
| 5,051,483 | 9/1991 | Rock et al. | 525/425 |
| 5,411,999 | 5/1995 | Gallucci | 523/436 |
| 5,623,026 | * 4/1997 | Buekers et al. | 525/474 |

FOREIGN PATENT DOCUMENTS

| | | |
|---|---|---|
| 53825 | * 6/1982 | (EP) . |
| 0 519 657 A1 | 12/1992 | (EP) . |
| 0 594 386 A1 | 10/1993 | (EP) . |
| 0 704 487 A1 | 4/1996 | (EP) . |
| 61-173937 | * 8/1986 | (JP) . |
| WO 94/10245 | 5/1994 | (WO) . |

* cited by examiner

Primary Examiner—Robert E. L. Sellers

(57) ABSTRACT

A thermoplastic resin composition containing a polyetherimide resin, an aromatic polycarbonate resin and a functionalized polysiloxane polymer exhibits flame retarding properties.

12 Claims, No Drawings

FLAME RETARDANT POLYETHERIMIDE RESIN COMPOSITION WITH POLYCARBONATE AND POLYSILOXANE

FIELD OF THE INVENTION

The invention relates to thermoplastic polyetherimide resin compositions that exhibit flame retardant properties.

BRIEF DESCRIPTION OF THE RELATED ART

Polyetherimide resins exhibit certain physical properties, such as, for example, high strength at elevated temperature, that make them appropriate for use in high temperature applications. Certain applications, such as aircraft cabin interior components, require flame retardant properties in addition to resistance to elevated temperatures.

Flame resistant polymer blends that contain a polyetherimide resin, a polycarbonate resin and a siloxane polyetherimide copolymer are disclosed in coassigned U.S. Pat. No. 5,051,483.

While the polymer blends disclosed in the '483 patent were found to meet the flammability requirements applicable to aircraft interior components, polyetherimide resin compositions that provide improved flame retardant properties or that provide improved flame retardant properties at reduced cost are desired.

SUMMARY OF THE INVENTION

The present invention is directed to a thermoplastic resin composition comprising:

(a) a polyetherimide resin;
(b) an aromatic polycarbonate resin; and
(c) an amount of a functionalized polysiloxane polymer that is effective to improve the flame retarding properties of the thermoplastic resin composition.

The thermoplastic resin composition of the present invention exhibits high strength at elevated temperatures, good impact resistance and improved flame retardant properties.

DETAILED DESCRIPTION OF THE INVENTION

In a preferred embodiment, the thermoplastic resin composition comprises, based on 100 pbw of the combined polyetherimide resin and aromatic polycarbonate resin, from 60 to 90 pbw, more preferably from 70 to 80 pbw, of the polyetherimide resin, from 10 to 40 pbw, more preferably from 20 to 30 pbw, of the aromatic polycarbonate resin and from 0.1 to 4 pbw, more preferably from 0.2 to 1 pbw, of the functionalized polysiloxane polymer.

In a preferred embodiment, the thermoplastic resin composition consists essentially of the polyetherimide resin, the aromatic polycarbonate resin and the functionalized polysiloxane polymer.

Polyetherimide resins suitable for use as the polyetherimide resin component of the thermoplastic resin of the composition of the present invention are known compounds whose preparation and properties have been described, see generally, U.S. Pat. Nos. 3,803,085 and 3,905,942, the respective disclosures of which are incorporated herein by reference.

In a preferred embodiment, the polyetherimide resin component of the present invention contains from greater than 1 to 1000 or more, preferably from 10 to 1000, structural units of the formula (I):

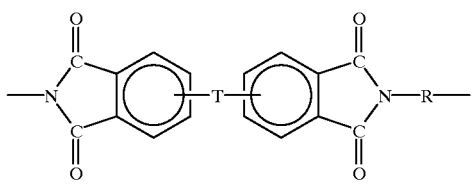

wherein the divalent T moiety bridges the 3,3', 3,4', 4,3', or 4,4' positions of the aryl rings of the respective aryl imide moieties of formula (I); T is —O— or a group of the formula —O—Z—O—; Z is a divalent radical selected from the group consisting of formulae (II):

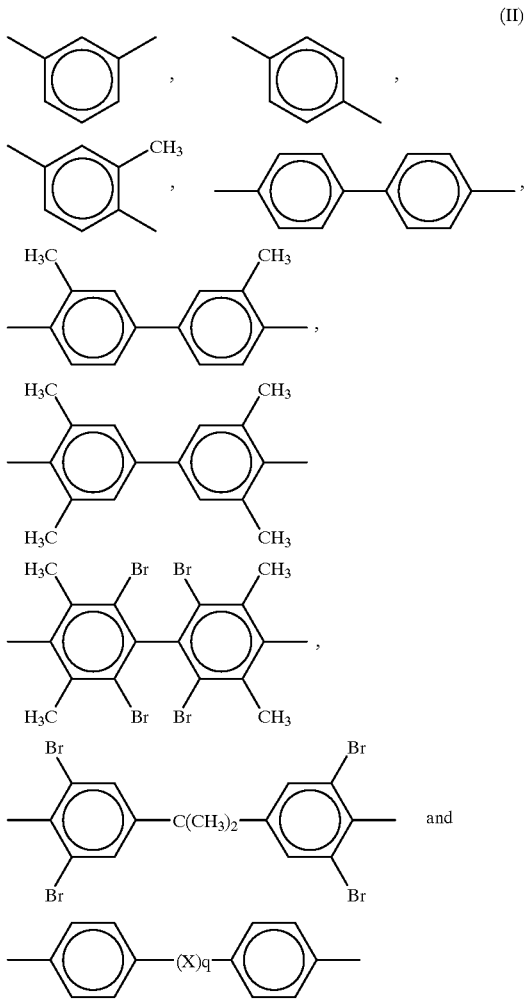

wherein X is a member selected from the group consisting of divalent radicals of the formulae (III):

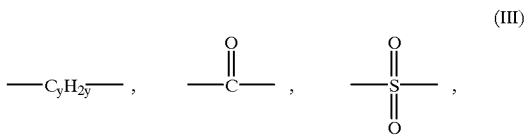

-continued

—O— and —S— wherein y is an integer from 1 to about 5, and q is 0 or 1; R is a divalent organic radical selected from the group consisting of: (a) aromatic hydrocarbon radicals having from 6 to about 20 carbon atoms and halogenated derivatives thereof, (b) alkylene radicals having from 2 to about 20 carbon atoms, (c) cycloalkylene radicals having from 3 to about 20 carbon atoms, and (d) divalent radicals of the general formula (IV):

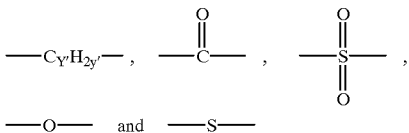

(IV)

where Q is a member selected from the group consisting of formulae (V):

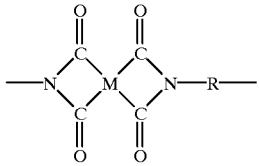

(V)

where y' is an integer from about 1 to about 5.

In one embodiment, the polyethermide resin may be a copolymer which, in addition to the etherimide units described above, further contains polyimide repeating units of the formula (VI):

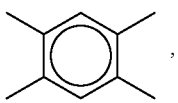

(VI)

wherein R is as previously defined for formula (I) and M is selected from the group consisting of formula (VII):

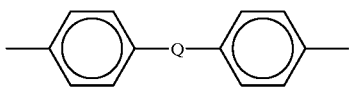

(VII)

formula (VIII):

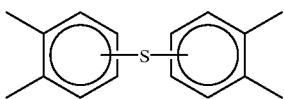

(VIII)

and formula (IX):

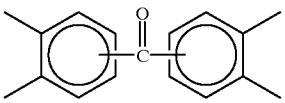

(IX)

Polyetherimide resins are made by known methods, such as, for example, those disclosed in U.S. Pat. Nos. 3,847,867, 3,814,869, 3,850,885, 3,852,242, 3,855,178 and 3,983,093, the disclosures of which are hereby incorporated herein by reference.

In a preferred embodiment, the polyetherimide resin is made by the reaction of an aromatic bis(ether anhydride) of the formula (X):

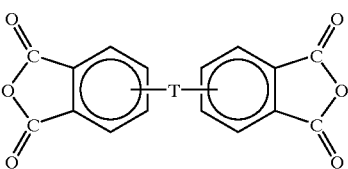

(X)

with an organic diamine of the formula (XI):

$H_2N-R-NH_2$ (XI)

wherein T and R are defined as described above in formula (I). In general the reactions can be carried out employing well-known solvents, for example, o-dichlorobenzene, m-cresol/toluene and the like to effect interaction between the anhydride of formula (X) and the diamine of formula (XI), at temperatures from about 100° C. to about 250° C. Alternatively, the polyethermide resin can be prepared by melt polymerization of aromatic bis(ether anhydride)s and diamines accomplished by heating a mixture of the ingredients at elevated temperatures with concurrent stirring. Generally melt polymerizations employ temperatures between about 200° C. and 400° C. Chain stoppers and branching agents may also be employed in the reaction.

Examples of specific aromatic bis(ether anhydrides) and organic diamines are disclosed, for example, in U.S. Pat. Nos. 3,972,902 and 4,455,410, which are incorporated by reference herein.

Illustrative examples of aromatic bis(ether anhydride)s of formula (X) include: 2,2-bis(4-(3,4-dicarboxyphenoxy) phenyl)propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis([4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-3,4-dicarboxyphenoxy)diphenyl-2,2-propane dianhydride; 4-(2, 3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy) benzophenone dianhydride and 4-(2,3-dicarboxyphenoxy)-4'-(3,4-dicarboxyphenoxy)diphenyl sulfone dianhydride, as well as various mixtures thereof.

A preferred class of aromatic bis(ether anhydride)s included by formula (X) above includes compounds wherein T is of the formula (XII):

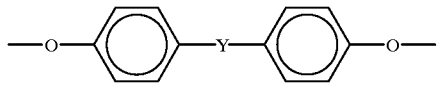

(XII)

wherein each Y is independently selected from the group consisting of: formulae (XIII):

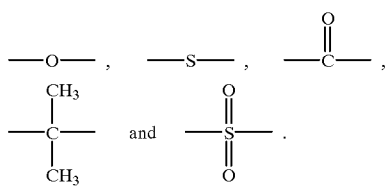

(XIII)

When polyetherimide/polyimide copolymers are employed, a dianhydride, such as pyromellitic anhydride, is used in combination with the bis(ether anhydride).

The bis(ether anhydride)s can be prepared by the hydrolysis, followed by dehydration, of the reaction product of a nitro substituted phenyl dinitrile with a metal salt of dihydric phenol compound in the presence of a dipolar, aprotic solvent.

Suitable organic diamines of formula (XI) include, for example: m-phenylenediamine; p-phenylenediamine; 4,4'-diaminodiphenylpropane, 4,4'-diaminodiphenylmethane (commonly named 4,4'-methylenedianiline); 4,4'-diaminodiphenyl sulfide; 4,4'-diaminodiphenyl sulfone; 4,4'-diaminodiphenyl ether (commonly named 4,4'-oxydianiline); 1,5-diaminonaphthalene; 3,3-dimethylbenzidine; 3,3-dimethoxybenzidine; 2,4-bis(beta-amino-t-butyl)toluene; bis(p-beta-amino-t-butylphenyl) ether; bis(p-beta-methyl-o-aminophenyl)benzene; 1,3-diamino-4-isopropylbenzene; 1,2-bis(3-aminopropoxy) ethane; benzidine; m-xylylenediamine; 2,4-diaminotoluene; 2,6-diaminotoluene; bis(4-aminocyclohexyl)methane; 3-methylheptamethylenediamine; 4,4-dimethylheptamethylenediamine; 2,11-dodecanediamine; 2,2-dimethylpropylenediamine; 1,18-octamethylenediamine; 3-methoxyhexamethylenediamine; 2,5-dimethylhexamethylenediamine; 2,5-dimethylheptamethylenediamine; 3-methylheptamethylenediamine; 5-methylnonamethylenediamine; 1-4-cyclohexanediamine; 1,18-octadecanediamine; bis(3-aminopropyl)sulfide; N-methyl-bis(3-aminopropyl)amine; hexamethylenediamine; heptamethylenediamine; nonamethylenediamine; decamethylenediamine and mixtures of such diamines.

Illustrative of a particularly preferred polyethermide resin falling within the scope of formula (I) is one comprising repeating units wherein R is paraphenylene, metaphenylene, or mixtures of paraphenylene and metaphenylene and T is a group of the formula —O—Z—O— wherein Z has the formula (XIV):

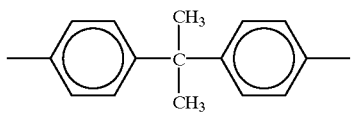

(XIV)

and wherein the divalent group (XIV) bridges the 3,3' positions of the aryl rings of the respective aryl imide moieties of formula (I).

Generally, useful polyetherimide resins have an intrinsic viscosity [η] greater than about 0.2 deciliters per gram, preferably of from about 0.35 to about 0.7 deciliters per gram measured in m-cresol at 25° C.

In a preferred embodiment, the polyetherimide resin of the present invention resin has a weight average molecular weight of from about 10,000 to about 150,000 grams per mole ("g/mol"), as measured by gel permeation chromatography, using a polystyrene standard.

Aromatic polycarbonate resins suitable for use as the aromatic polycarbonate resins component of the thermoplastic resin composition of the present invention are known compounds whose preparation and properties have been described, see, generally, U.S. Pat. Nos. 3,169,121, 4,487, 896 and 5,411,999, the respective disclosures of which are each incorporated herein by reference.

Aromatic polycarbonate resins are, in general, made by reacting a dihydric phenol with a carbonate precursor.

Suitable dihydric phenols include, for example, one or more of 2, 2-bis-(4-hydroxyphenyl) propane ("bisphenol A"), 2,2-bis(3,5-dimethyl-4-hydroxyphenyl)propane, bis(4-hydroxyphenyl) methane, 4,4-bis(4-hydroxyphenyl) heptane, 3,5,3',5'-tetrachloro-4,4'-dihydroxyphenyl) propane, 2,6-dihydroxy naphthalene, hydroquinone, 2,4'-dihydroxyphenyl sulfone. In a highly preferred embodiment, the dihydric phenol is 2,2-bis-(4-hydroxyphenyl)propane.

The carbonate precursor is one or more of a carbonyl halide, a carbonate ester or a haloformate. Suitable carbonyl halides include, for example, carbonyl bromide and carbonyl chloride. Suitable carbonate esters include, such as for example, diphenyl carbonate, dichlorophenyl carbonate, dinaphthyl carbonate, phenyl tolyl carbonate and ditolyl carbonate. Suitable haloformates include for example, bishaloformates of a dihydric phenols, such as, for example, hydroquinone, or glycols, such as, for example, ethylene glycol, neopentyl glycol. In a highly preferred embodiment, the carbonate precursor is carbonyl chloride.

Suitable aromatic polycarbonate resins include linear aromatic polycarbonate resins, branched aromatic polycarbonate resins. Suitable linear aromatic polycarbonates resins include, for example, bisphenol A polycarbonate resin. Suitable branched polycarbonates are known and are made by reacting a polyfunctional aromatic compound with a dihydric phenol and a carbonate precursor to form a branched polymer, see generally, U.S. Pat. Nos. 3,544,514, 3,635,895 and 4,001,184, the respective disclosures of which are incorporated herein by reference. The polyfunctional compounds are generally aromatic and contain at least three functional groups which are carboxyl, carboxylic anhydrides, phenols, haloformates or mixtures thereof, such as, for example, 1,1,1-tri(4-hydroxyphenyl)ethane, 1,3,5,-trihydroxy-benzene, trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenone-tetracarboxylic dianhydride.

The preferred polyfunctional aromatic compounds are 1,1, 1-tri(4-hydroxyphenyl)ethane, trimellitic anhydride or trimellitic acid or their haloformate derivatives.

The preferred polycarbonates for use in the present invention are those derived from bisphenol A and phosgene and, in general, have an intrinsic viscosity of about 0.3 to about 1.5 deciliters per gram in methylene chloride at 25° C. In a preferred embodiment, the weight average molecular weight of the polycarbonate resin is at least about 30,000 g/mol, as determined by gel permeation chromatography relative to polystyrene, more preferably from about 35,000 to about 40,000 g/mol.

Functionalized polysiloxane polymers suitable for use as the functionalized polysiloxane polymer component of the composition of the present invention are functionalized linear or branched polysiloxane polymers that contain one or more functional groups per molecule. Suitable functional groups include, for example, H, $(C_2-C_{20})$alkenyl, $(C_2-C_{20})$alkynyl, $(C_1-C_{20})$alkoxyl, amino, aminoalkyl amido and epoxy. In a preferred embodiment the polysiloxane polymer has a weight average molecular weight of greater than about 1,500 g/mol. Suitable functionalized polysiloxane fluids are known compounds that are made by known methods and are commercially available from a number of sources.

In a preferred embodiment, the functionalized polysiloxane polymer comprises a functionalized linear polysiloxane polymer according to structural formula (XVII):

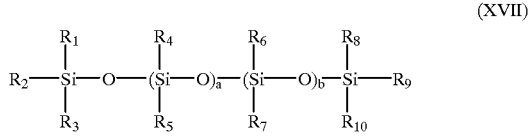

(XVII)

wherein:

$R_1$, $R_2$, $R_3$, $R_4$, $R_5$, $R_6$, $R_7$, $R_8$, $R_9$ and $R_{10}$ are each independently $(C_1-C_{20})$alkyl, or a functional group selected from H, $(C_2-C_{20})$alkenyl, $(C_2-C_{20})$alkynyl, $(C_1-C_{20})$alkoxyl, amino, aminoalkyl amido and epoxy, provided that at least one of $R_1$, $R_2$, $R_3$, $R_4$, $R_5$, $R_6$, $R_7$, $R_8$, $R_9$ and $R_{10}$ is a functional groups so that the functionalized polysiloxane polymer contains one or more functional group per molecule, and a and b are integers selected such that the functionalized linear polysiloxane polymer exhibits a weight average molecular weight of from about 1,500 to about 30,000 g/mol.

In a preferred embodiment, the functional group is selected from H, amino, aminoalkyl and epoxy.

In a highly preferred embodiment, $R_5$ is H, $R_1$, $R_2$, $R_3$, $R_4$, $R_8$, $R_9$ and $R_{10}$ are each independently $(C_1-C_{20})$alkyl, more preferably methyl, b is 0 and a is selected such the functionalized linear polysiloxane polymer exhibits a weight average molecular weight from about 1,500 to about 30,000 g/mol, more preferably from about 3,000 to about 12,000 g/mol.

The thermoplastic resin composition of the present invention may, optionally, also contain various additives which are known in the art, such as antioxidants, fillers and reinforcing agents, such as, for example, silicates, $TiO_2$, glass fibers, carbon black, graphite, talc, mica and other additives such as, for example, UV absorbers, light stabilizers, lubricants, plasticizers, pigments, dyes, colorants and anti-static agents, as well as additional flame retardant additives, including siloxane-polyetherimide copolymers.

The preparation of the compositions of the present invention is normally achieved by combining the components under conditions suitable for the formation of a blend of the components. Suitable conditions include, for example, solution blending or melt mixing in single or twin screw type extruders, mixing bowl, or similar mixing devices which can apply a shear to the components. Twin screw extruders are often preferred due to their more intensive mixing capability over single screw extruders. It is often advantageous to apply a vacuum to the melt through at least one vent port in the extruder to remove volatile impurities in the composition.

The composition of the present invention can be molded into useful shaped articles, such as aircraft interior components such as, for example, wall panels, overhead storage lockers, serving trays and seat backs, by a variety of means such as, for example, injection molding or extrusion.

EXAMPLES 1–3 AND COMPARATIVE EXAMPLES C1 AND C2

The thermoplastic resin compositions of Examples 1–3 of the present invention and Comparative Examples C1 and C2 were each made by combining the components described below in the relative amounts (each expressed in pbw, based on 100 pbw of the respective thermoplastic resin composition) set forth in TABLE I. The components used in the thermoplastic resin compositions were as follows:

PEI: Polyetherimide resin made by condensation of 2,2-bis[4-(3,4-dicarboxyphenoxy)phenyl]propane dianhydride with metaphenylene diamine and having a melt index of 0.9 g/min.

PC: Polycarbonate resin derived from bisphenol A and phosgene and having weight average molecular weight of about 35,000 g/mole.

PMHS: A trimethylsilyloxy-terminated poly(methyl hydrogen siloxane) polymer having a weight average molecular weight of about 7,000 g/mole.

Si-PEI: Siloxane/polyetherimide copolymer made by condensation of 2,2-bis(2,3-dicarboxy phenoxy phenol) propane dianhydride with metaphenylene diamine and an aminopropyl-terminated $D_{10}$ polydimethylsiloxane, containing 34 wt % of structural units derived from the polydimethylsiloxane and having a molecular weight of about 60,000 g/mole.

Test specimens of the compositions of Comparative Examples C1 and C2 and Examples 1–3 were molded and the flammability properties of the specimens were measured according to the protocols of Federal Aviation Regulations ("FAR") ignition and burning length testing (see FAR 25.853a Appendix F, Part I), Ohio State University ("OSU") heat release testing (see FAR 25.853a Appendix F, Part V), National Bureau of Standards ("NBS") smoke chamber testing (see FAR 25.853a Appendix F, Part IV).

The results of the testing of the specimens molded from the compositions of Comparative Examples C1 and C2 and Examples 1–3 are set forth below in TABLE I as 2 minute and peak OSU heat release values, each expressed in kilowatts per square meter ("$kW/m^{2}$"), FAR Ignition Flameout, expressed in seconds ("FAR, IF (s)"), FAR Burning Length, expressed in inches ("FAR, BL (in)"), 1.5 minute, 4.0 minute and maximum NBS smoke density, expressed as specific optical density ("$D_{s-1.5}$, $D_{s-4.0}$, $D_{s-max}$") and the time corresponding to maximum smoke density, expressed in minutes ("$t_{Ds-max}$(min)").

TABLE I

|  | CEx #C1 | CEx #C2 | Ex #1 | Ex #2 | Ex #3 |
|---|---|---|---|---|---|
| PEI | 70 | 76 | 79.8 | 79 | 78 |
| PC | 30 | 20 | 20 | 20 | 20 |
| Si-PEI | — | 4 | — | — | — |
| PMHS | — | — | 0.2 | 1.0 | 2.0 |
| Properties |  |  |  |  |  |
| OSU, 2 min (kW/m$^2$) | 40 | 30 | 30 | 28 | 29 |
| OSU, Peak (kW/m$^2$) | 80 | 40 | 52 | 54 | 60 |
| FAR, IF(s) | 3 | 0 | 1 | 1 | 0 |
| FAR, BL (in) | 3 | 2 | 2 | 2 | 2 |
| NBS, $D_{s-1.5}$ | — | 2 | 1 | 1 | 1 |
| NBS, $D_{s-4.0}$ | — | 37 | 10 | 11 | 10 |
| NBS, $D_{s-max}$ | — | 37 ± 10 | 10 ± 1 | 11 ± 0 | 10 ± 4 |
| NBS, $t_{Ds-max}$ (min.) | — | 4 | 4 | 4 | 4 |

The compositions of Examples 1, 2 and 3 each exhibited improved flame resistance, that is, reduced OSU heat release, a shorter time to FAR ignition flameout and shorter FAR burning length, compared to the composition of Comparative Example C1.

The compositions of Examples 1, 2 and 3 each exhibit OSU heat release and FAR ignition flameout and burning length results that either closely approach or are equivalent to those exhibited by Comparative Example C2 and exhibit improved performance in the NBS smoke density test compared to the composition of Comparative Example C2.

What is claimed is:

1. A thermoplastic resin composition, comprising:
   (a) a polyetherimide resin;
   (b) an aromatic polycarbonate resin; and
   (c) a functionalized linear polysiloxane polymer comprising a trimethylsilyloxy-terminated poly(methyl hydrogen siloxane) polymer having a weight average molecular weight of about 1,500 to about 30,000 grams per mole;

wherein the composition comprises, based on 100 parts by weight of the combined polyetherimide resin and aromatic polycarbonate resin, from 60 to 90 parts by weight of the polyetherimide resin, from 10 to 40 parts by weight of the aromatic polycarbonate resin, and from 0.1 to 4.0 parts by weight of the functionalized linear polysiloxane polymer; and wherein the composition has a peak heat release value of 52 to 60 kW/m$^2$ measured according to Federal Aviation Regulations 25.853a, Appendix F, Part V.

2. The composition of claim 1, wherein the composition comprises from 0.2 to 1.0 parts by weight of the functionalized polysiloxane polymer, based on 100 pbw of the combined polyetherimide resin and aromatic polycarbonate resin.

3. The composition of claim 1, wherein the polyetherimide resin comprises structural units of the formula (I):

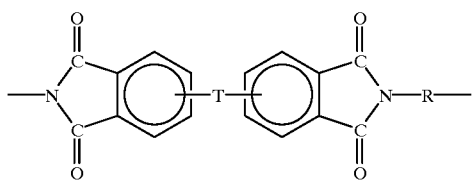

(I)

wherein the divalent T moiety bridges the 3,3',3,4',4,3', or 4,4' positions of the aryl rings of the respective aryl imide moieties of formula (I); T is —O— or a group of the formula —O—Z—O—; Z is a divalent radical selected from the group consisting of formulae (II):

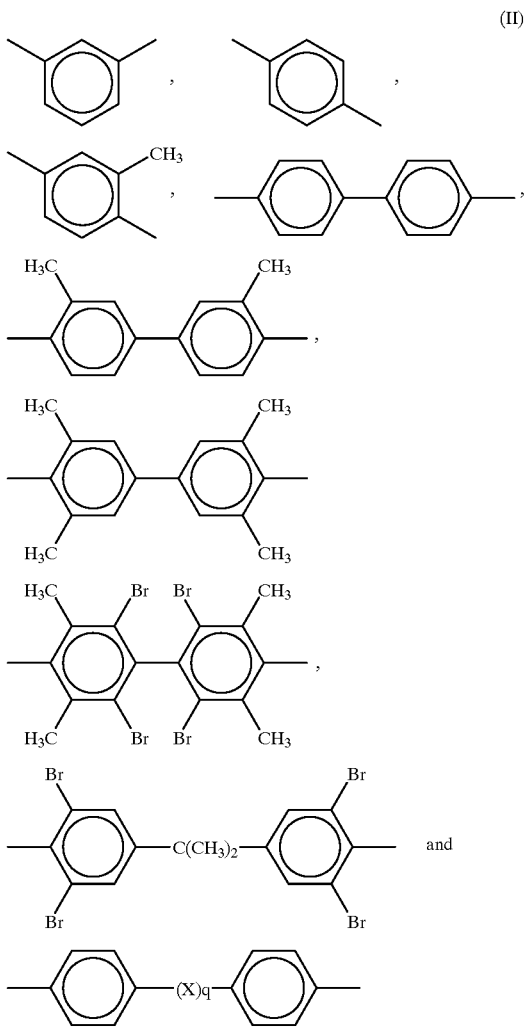

(II)

wherein X is a member selected from the group consisting of divalent radicals of the formulae (III):

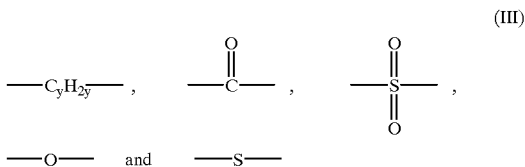

(III)

wherein y is an integer from 1 to about 5, and q is 0 or 1; R is a divalent organic radical selected from the group consisting of: (a) aromatic hydrocarbon radicals having from 6 to about 20 carbon atoms and halogenated derivatives thereof, (b) alkylene radicals having from 2 to about 20 carbon atoms, (c) cycloalkylene radicals having from 3 to about 20 carbon atoms, and (d) divalent radicals of the general formula (IV):

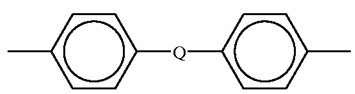

(IV)

where Q is a member selected from the group consisting of formulae (V):

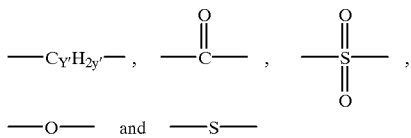

(V)

—O— and —S— where y' is an integer from about 1 to about 5.

4. The composition of claim 1, wherein the polyetherimide resin comprises the reaction product formed by melt polymerization of 2,2-bis[4-(3,4-dicarboxyphenoxy)phenyl]propane dianhydride with metaphenylene diamine.

5. The composition of claim 1, wherein the aromatic polycarbonate resin is made by reacting a dihydric phenol with a carbonate precursor selected from the group consisting of carbonyl halides, carbonate esters, haloformates, and mixtures thereof.

6. The composition of claim 1, wherein the trimethylsilyloxy-terminated poly(methyl hydrogen siloxane) polymer has a weight average molecular weight of from about 3,000 to about 12,000 grams per mole.

7. A shaped article made by molding the composition of claim 1.

8. A thermoplastic resin composition, comprising the composition obtained by blending a polyetherimide resin; an aromatic polycarbonate resin; and a functionalized linear polysiloxane polymer comprising a trimethylsilyloxy-terminated poly(methyl hydrogen siloxane) polymer having a weight average molecular weight of about 1,500 to about 30,000 grams per mole; and wherein the composition comprises, based on 100 parts by weight of the combined polyetherimide resin and aromatic polycarbonate resin, from 60 to 90 parts by weight of the polyetherimide resin, from 10 to 40 parts by weight of the aromatic polycarbonate resin, and from 0.1 to 4.0 parts by weight of the functionalized polysiloxane polymer; and wherein the composition has a peak heat release value of 52 to 60 kW/m² measured according to Federal Aviation Regulations 25.853a, Appendix F, Part V.

9. A thermoplastic resin composition, comprising:
  (a) from 70 to 80 parts by weight of a polyetherimide resin comprising the polycondensation product of 2,2-bis-[4-(3,4-dicarboxyphenoxy)phenyl]propane dianhydride with metaphenylene diamine;
  (b) from 20 to 30 parts by weight of an aromatic polycarbonate resin comprising the product of the reaction of 2,2-bis-(4-hydroxyphenyl)propane with a carbonate precursor; and
  (c) from 0.2 to 1.0 parts by weight of a functionalized linear polysiloxane polymer comprising a trimethylsilyloxy-terminated poly(methyl hydrogen siloxane) polymer having a weight average molecular weight of from about 3,000 to about 12,000 grams per mole;

wherein all parts by weight are based on 100 parts by weight of the combined polyetherimide resin and aromatic polycarbonate resin; and wherein the composition has a peak heat release value of 52 to 60 kW/m² measured according to Federal Aviation Regulations 25.853a, Appendix F, Part V.

10. A thermoplastic resin composition, consisting essentially of:
  (a) from 70 to 80 parts by weight of a polyetherimide resin comprising the polycondensation product of 2,2-bis-[4-(3,4-dicarboxyphenoxy)phenyl]propane dianhydride with metaphenylene diamine;
  (b) from 20 to 30 parts by weight of an aromatic polycarbonate resin comprising the product of the reaction of 2,2-bis-(4-hydroxyphenyl)propane with a carbonate precursor; and
  (c) from 0.2 to 1.0 parts by weight of a functionalized linear polysiloxane polymer comprising a trimethylsilyloxy-terminated poly(methyl hydrogen siloxane) polymer having a weight average molecular weight of from about 3,000 to about 12,000 grams per mole;

wherein all parts by weight are based on 100 parts by weight of the combined polyetherimide resin and aromatic polycarbonate resin; and wherein the composition has a peak heat release value of 52 to 60 kW/m² measured according to Federal Aviation Regulations 25.853a, Appendix F, Part V.

11. The composition of claim 1, wherein the composition exhibits a heat release at 2 minutes of 28 to 30 kW/m² as measured according to Federal Aviation Regulation 25,853a, Appendix F, Part V.

12. The composition of claim 1, wherein the composition exhibits a maximum smoke density of 10 to 11 as measured according to Federal Aviation Regulation 25,853a, Appendix F, Part IV.

* * * * *